(12) United States Patent
Bunch, Jr.

(10) Patent No.: US 7,293,948 B2
(45) Date of Patent: Nov. 13, 2007

(54) FLEXIBLE THREADED FASTENER

(75) Inventor: Troy J. Bunch, Jr., Kallar, TX (US)

(73) Assignee: Textron Innovations, Inc., Providence, RI (US)

( * ) Notice: Subject to any disclaimer, the term of this patent is extended or adjusted under 35 U.S.C. 154(b) by 428 days.

(21) Appl. No.: 10/410,854

(22) Filed: Apr. 9, 2003

(65) Prior Publication Data

US 2004/0202526 A1   Oct. 14, 2004

(51) Int. Cl.
*F16B 35/00* (2006.01)

(52) U.S. Cl. .................................. 411/392; 411/395

(58) Field of Classification Search .............. 411/392, 411/395, 424, 186, 544
See application file for complete search history.

(56) References Cited

U.S. PATENT DOCUMENTS

| | | | | |
|---|---|---|---|---|
| 602,378 A * | 4/1898 | Thomson | ...................... | 73/277 |
| 969,383 A * | 9/1910 | Mahoney | ...................... | 411/379 |
| 1,172,406 A * | 2/1916 | Taylor | ...................... | 411/395 |
| 1,635,082 A * | 7/1927 | Hultgren et al. | ............ | 411/189 |
| 1,926,925 A * | 9/1933 | Wescott | ...................... | 403/296 |
| 2,006,276 A * | 6/1935 | Nodiere | ...................... | 411/392 |
| 2,253,241 A * | 8/1941 | MacDonald | ................. | 411/186 |
| 2,546,332 A * | 3/1951 | Costello | ......................... | 411/9 |
| 2,895,368 A * | 7/1959 | Trigg, Jr. et al. | ........... | 411/396 |
| 3,056,443 A * | 10/1962 | Knocke | ...................... | 411/186 |
| 3,067,980 A | 12/1962 | Welsh | | |
| 3,565,472 A | 2/1971 | Sicholm | | |
| 5,061,137 A * | 10/1991 | Gourd | ......................... | 411/510 |
| 5,102,276 A * | 4/1992 | Gourd | ......................... | 411/392 |

FOREIGN PATENT DOCUMENTS

| | | |
|---|---|---|
| DE | 10 23 929 | 2/1958 |
| GB | 2 085 541 | 4/1981 |

* cited by examiner

*Primary Examiner*—Flemming Saether
(74) *Attorney, Agent, or Firm*—Pillsbury Winthrop Shaw Pittman LLP

(57) ABSTRACT

A fastener includes a head, a threaded member, and a resilient shank portion interconnecting the head portion and the threaded portion. The shank portion includes a first end adjacent the head and a second end adjacent the threaded member. The shank includes a tubular section having an inner wall and an outer wall between the first end and the second end. The tubular section has a curved axial profile. The tubular section is axially elastically deformed as the fastener is torqued down.

26 Claims, 1 Drawing Sheet

FLEXIBLE THREADED FASTENER

GOVERNMENT RIGHTS STATEMENT

This invention was made with Government support under Contract No. N00019-91-C-0172 awarded by the Department of the Navy. The Government has certain rights in this invention.

FIELD OF THE INVENTION

The present invention relates generally to the field of fasteners, and more particularly to threaded fastener having an axially elastic shank.

DESCRIPTION OF THE PRIOR ART

A common device for clamping together two halves of a mechanical joint is a threaded fastener such as a bolt or a screw. When a threaded fastener is torqued down, the fastener is preloaded to hold the joint tightly together. Over time and through use, the axial dimensions of the clamped members of the joint may change, thereby reducing the preload on the fastener and causing the joint to loosen. Also, a fastener may tend to untorque to cause the joint to loosen. In order to maintain the integrity of the joint, it is usually necessary to re-torque the fasteners periodically.

SUMMARY OF THE INVENTION

Briefly stated, the present invention provides a fastener including a head, a threaded member, and a resilient shank portion interconnecting the head portion and the threaded portion. The shank portion includes a first end adjacent the head and a second end adjacent the threaded member. The shank includes a tubular section having an inner wall and an outer wall between the first end and the second end. The tubular section has a curved axial profile. The tubular section is axially elastically deformed as the fastener is torqued down.

DESCRIPTION OF THE PREFERRED EMBODIMENT

Figure 1:
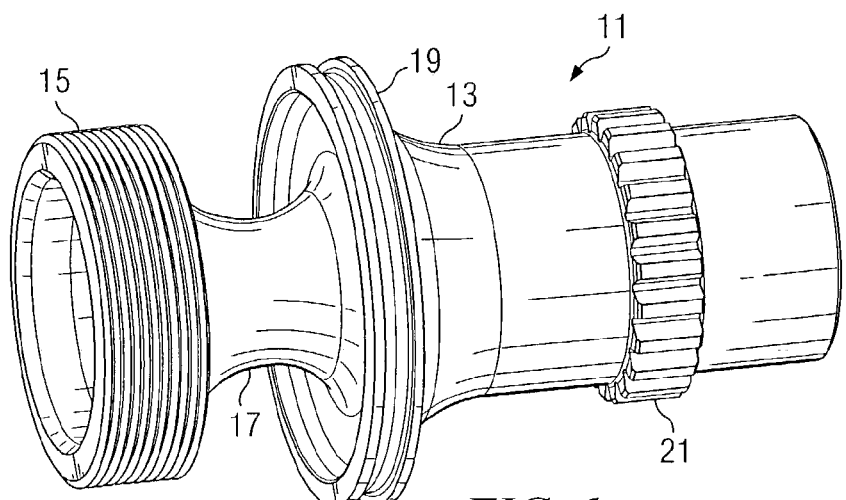
FIG. 1 is a perspective view of a fastener according to the present invention.

Referring now to the drawings, and first to FIG. 1, a fastener according to the present invention is designated generally by the numeral 11. Fastener 11 is of generally tubular construction having an outer wall 14 and an inner wall 16. Fastener 11 includes a head 13, a threaded member 15, and a shank 17 connecting head 13 and threaded member 15.

Head 13 includes a radially outwardly extending flange 19. Head 13 also includes a wrench spline 21 that may be engaged by a spanner wrench or the like to apply torque to fastener 11. Those skilled in the art will recognize that fastener 11 can include other wrench engaging arrangements, such as wrench flats and the like.

Figure 2:
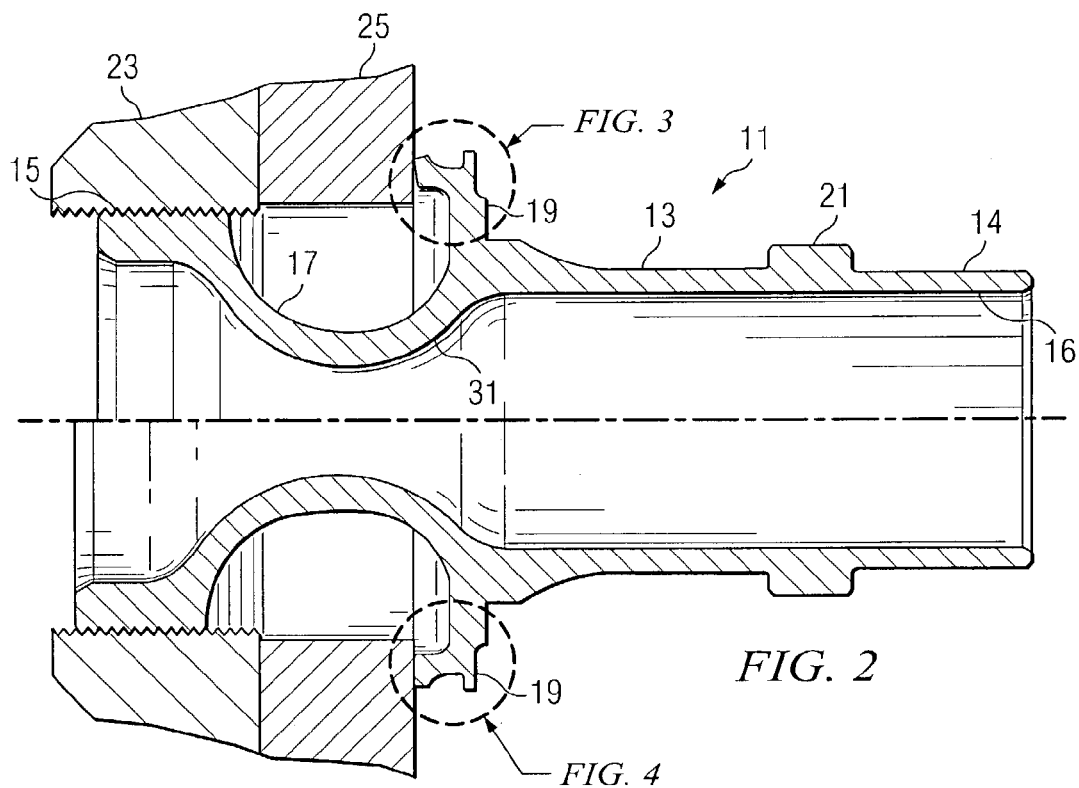
FIG. 2 is a section view of a fastener according to the present invention engaged with a member.
Figure 3:
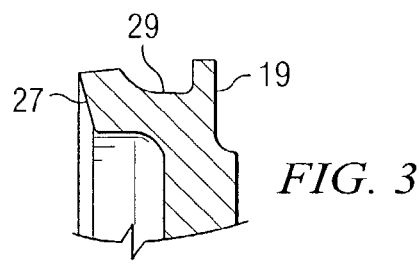
FIG. 3 is a first detail view taken from FIG. 2.

FIG. 2 illustrates sectional views of fastener 11 engaged with a mechanical joint including member 23 having a threaded bore and a second member having a smooth bore 25. The upper half of FIG. 3 illustrates fastener 11 in hand-tight engagement with the joint comprising members 23 and 25. The lower half of FIG. 2 illustrates fastener 11 in torqued engagement with the joint.

Figure 4:
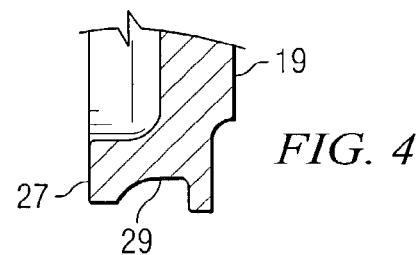
FIG. 4 is a second detail view taken from FIG. 2.

As best illustrated in FIG. 3, flange 11 includes a frusto-conical face 27. The taper of face 27 is exaggerated in FIG. 3 for purposes of illustration. Preferably, the taper of face 27 is on the order of one degree. Flange 19 may include an annular grove 29 axially rearward of face 27. When fastener 11 is torqued to its preloaded position, as illustrated in the lower half of FIG. 2, flange 19 elastically deforms such that face 27 becomes flush with member 25, as illustrated in FIG. 4. Groove 29 aids in the elastic deformation of flange 29.

Shank 17 includes a curved neck 31. As illustrated in FIG. 2, neck 31 has an inwardly curved, C-shaped or horseshoe-shaped axial profile. When fastener 11 is torqued to its made-up configuration with respect to the joint, neck 31 is elastically deformed thereby to impart stretch to shank 17. More specifically and is shown in the lower half of FIG. 2, neck 31 is elastically deformed between threaded member 15 and flange 19 in the same way that a horse shoe may be stretched by applying force to its legs. As fastener 11 is rotated to advance threaded member 15 into thread bore 25, shank 17 stretches through the bending in the curved walls of neck 31 to axially preload fastener 11. The bending deflection results in a total axial deflection in fastener 11 that is much greater than that produced by the tensile strain of the material alone or that is produced in a conventional fastener with the same axial load and the same material cross-section. The increased deflection allows fastener 11 to maintain sufficient preload in the joint while adjusting to changes in the axial dimensions of the clamped members during operation of the joint. As the axial dimension of the joint shortens over time, shank 17 shortens. However, because of the elasticity provided by curved neck 31, fastener 11 retains sufficient preload to keep the joint tight. The fastener of the present invention thus eliminates the requirement of a periodic re-torque as is required with existing fasteners.

The fastener of the present invention has been illustrated and described with respect to presently preferred embodiments. Those skilled in the art will recognize other embodiments. For example, while the fastener of the present invention has been illustrated and described as a bolt-type fastener, those skilled in the art will recognize that present invention has applicability to other fasteners such as studs and the like. The foregoing description is for purposes of illustration rather than limitation.

What is claimed is:

1. A fastener comprising:
   a head portion having a first opening;
   a coupling portion having a second opening; and
   a shank portion positioned between said head portion and said coupling portion,
   said fastener being axially hollow such that a longitudinally extending hole extends completely through said fastener between said first and second openings with said hole having a reduced diameter portion within said shank portion.

2. The fastener according to claim 1, wherein
   said shank portion is defined by a tubular structure having an outer wall and an inner wall, with said inner wall having said reduced diameter portion and with said inner and outer walls being curved, each of said inner and outer walls of said shank portion forming an arc extending along the entire distance between the uppermost section of said coupling portion and the bottommost section of said head portion and said arc extending continuously between the uppermost section of said coupling portion and the bottommost section of said head portion.

3. The fastener according to claim 2, wherein
said coupling portion has threads on an outer surface to form a male connector, said threads including a first thread closest to said head portion, and said arc of said outer wall of said shank portion extends along the entire distance and continuously between said first thread and a bottom surface of said head portion.

4. A fastener according to claim 3, wherein the cross-sectional area of said coupling portion at the deepest point of said threads is greater than the cross-sectional area of said shank portion.

5. The fastener according to claim 2, wherein
said head portion, said coupling portion, and said shank portion are constructed from a single piece of material.

6. The fastener according to claim 2, wherein
said outer wall has a generally C-shaped axial profile and said inner wall has a shaped profile that is substantially identical to said generally C-shaped axial profile of said outer wall.

7. The fastener according to claim 2, wherein said head portion has a resilient outwardly extending flange that provides a frusto-conical face surface, said flange being constructed and arranged to elastically deform to axially preload said fastener, and said flange including said bottom surface of said head portion.

8. The fastener according to claim 7, wherein
said flange projects away from said bottom surface of said head portion in a direction that is towards the threaded portion.

9. The fastener according to claim 1, wherein
said head portion, said coupling portion, and said shank portion are constructed from a single piece of material.

10. The fastener according to claim 1, wherein said shank portion has an inwardly-curved axial profile.

11. The fastener according to claim 1, wherein said shank portion is elastically deformable.

12. The fastener according to claim 1, wherein said head portion includes a wrench engaging arrangement.

13. The fastener according to claim 12, wherein said wrench engaging arrangement is a spline.

14. The fastener according to claim 1, wherein
said shank portion is defined by a tubular structure having an outer wall and an inner wall, with said inner wall having said reduced diameter portion and with said inner and outer walls being curved the entire distance from said shank portion to said head portion, said coupling portion has threads on an outer surface to form a male connector, said head portion, said coupling portion, and said shank portion are constructed from a single piece of material, and each of said inner and outer walls has a generally C-shaped axial profile.

15. The fastener according to claim 14, wherein said head portion has a resilient outwardly extending flange that provides a frusto-conical face surface and an annular groove axially spaced from said face surface, said flange being constructed and arranged to elastically deform to axially preload said fastener, and said head portion includes a wrench engaging arrangement.

16. A fastener according to claim 1, wherein the coupling portion includes a threaded portion, and wherein a cross-sectional area of the fastener at a deepest portion of the threaded portion is greater than a cross-sectional area of the fastener at the reduced diameter portion within the shank portion.

17. A fastener comprising:
a head portion having a first opening;
a threaded portion having threads on an outer surface to form a male connector and having a second opening, said threads including a first thread closest to said head portion; and
a shank portion positioned between said head portion and said threaded portion,
said fastener being axially hollow such that a longitudinally extending hole extends between said first opening and said second opening and completely through said head portion, said threaded portion, and said shank portion, with said longitudinally extending hole having a reduced diameter portion within said shank portion,
said shank portion being defined by a tubular structure having an outer wall and an inner wall, with said inner wall having said reduced diameter portion and with said inner and outer walls being curved,
said outer wall of said shank portion forming an arc extending along the entire distance between said first thread of said threaded portion and a bottom surface of said head portion and said arc extending continuously between the uppermost section of said coupling portion and the bottommost section of said head portion.

18. The fastener according to claim 17, wherein
said head portion, said threaded portion, and said shank portion are constructed from a single piece of material.

19. The fastener according to claim 17, wherein
said outer wall has a generally C-shaped axial profile and said inner wall has a shaped profile that is substantially identical to said generally C-shaped axial profile of said outer wall.

20. The fastener according to claim 17, wherein said head portion has a resilient outwardly extending flange that provides a frusto-conical face surface and an annular groove axially spaced from said face surface, said flange being constructed and arranged to elastically deform to axially preload said fastener, and said flange including said bottom surface of said head portion.

21. A fastener according to claim 20, wherein
said flange projects away from said bottom surface of said head portion in a direction that is towards the threaded portion.

22. A fastener comprising:
a head portion;
a threaded portion having threads on an outer surface to form a male connector, said threads including a first thread closest to said head portion; and
a shank portion positioned between said head portion and said threaded portion,
said fastener being axially hollow such that a longitudinally extending hole extends completely through said shank portion with said hole having a reduced diameter portion within said shank portion,
said shank portion being defined by a tubular structure having an outer wall and an inner wall, with said inner wall having said reduced diameter portion and with said inner and outer walls being curved,
said outer wall of said shank portion forming an arc extending along the entire distance between said first thread of said threaded portion and a bottom surface of said head portion and said arc extending continuously between the uppermost section of said coupling portion and the bottommost section of said head portion.

23. The fastener according to claim 22, wherein said head portion, said threaded portion, and said shank portion are constructed from a single piece of material.

24. The fastener according to claim 22, wherein said outer wall has a generally C-shaped axial profile and said inner wall has a shaped profile that is substantially identical to said generally C-shaped axial profile of said outer wall.

25. The fastener according to claim 22, wherein said head portion has a resilient outwardly extending flange that provides a frusto-conical face surface and an annular groove axially spaced from said face surface, said flange being constructed and arranged to elastically deform to axially preload said fastener, and said flange including said bottom surface of said head portion.

26. A fastener comprising:
a head portion having a first opening and means for elastically deforming to axially preload said fastener;
a threaded portion having a second opening; and
a shank portion positioned between said head portion and said threaded portion,
said fastener being axially hollow such that a longitudinally extending hole extends completely through said fastener between said first and second openings,
said shank portion having means extending continuously along the entire extent of said shank portion for elastically deforming to axially preload said fastener.

* * * * *